United States Patent

Wu

[11] Patent Number: 5,044,226
[45] Date of Patent: Sep. 3, 1991

[54] STRUCTURE OF BICYCLE CHAIN TRANSMISSION

[76] Inventor: Ching-Rong Wu, No. 13, Hsin Hsing Rd., Tainan, China

[21] Appl. No.: 559,918

[22] Filed: Jul. 30, 1990

[51] Int. Cl.⁵ ............................................. G05G 1/14
[52] U.S. Cl. .................................. 74/594.3; 74/534.1; 74/534.2
[58] Field of Search ............................. 74/594.1–594.7

[56] References Cited

U.S. PATENT DOCUMENTS

| | | | |
|---|---|---|---|
| 935,495 | 9/1909 | Grout | 74/594.3 |
| 4,446,754 | 5/1984 | Chattin | 74/594.3 |
| 4,519,271 | 5/1985 | Chattin | 74/594.3 |
| 4,706,516 | 11/1987 | Xi | 74/594.3 X |
| 4,807,491 | 2/1989 | Stuckenbrok | 74/594.1 |

FOREIGN PATENT DOCUMENTS

| | | | |
|---|---|---|---|
| 2413253 | 7/1979 | France | 74/594.3 |
| 2487282 | 1/1982 | France | 74/594.3 |
| 2492936 | 4/1982 | France | 74/594.3 |
| 2550752 | 2/1985 | France | 74/594.3 |

Primary Examiner—Vinh T. Luong
Attorney, Agent, or Firm—Varndell Legal Group

[57] ABSTRACT

A bicycle chain transmission comprises a crank fastened in a bearing block on the outer side of a chain wheel and connected with a side projection of a ball bearing which is mounted on a connector which is eccentrically fastened in the bottom bracket axle of a bicycle. The rotation of the connector drives the ball bearing to rotate eccentrically and to drive the crank to automatically change its arm of force so as to minimize energy consumption in pedaling.

1 Claim, 2 Drawing Sheets

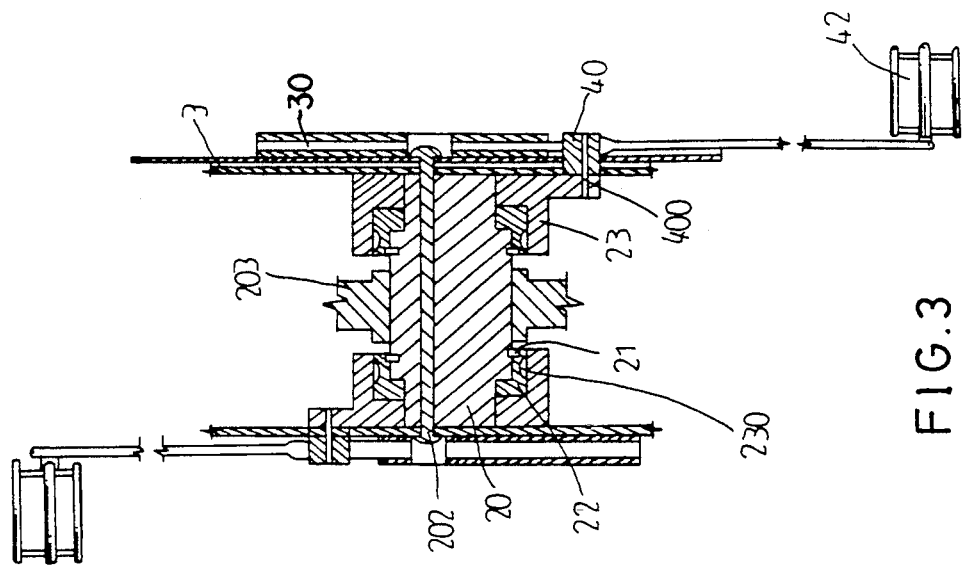
FIG.3
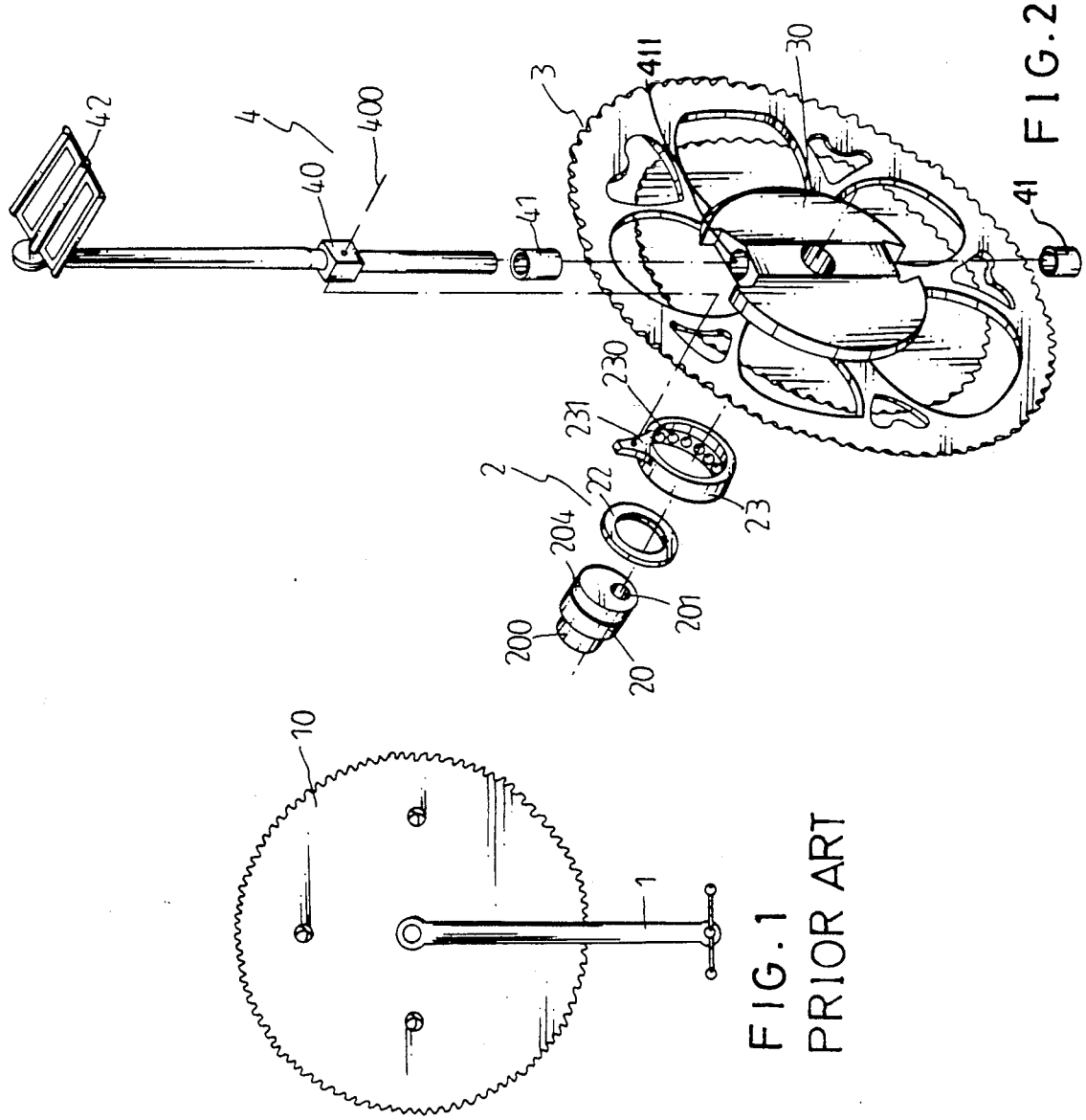
FIG.2
FIG.1 PRIOR ART

STRUCTURE OF BICYCLE CHAIN TRANSMISSION

BACKGROUND OF THE INVENTION

The present invention is related to bicycle chain transmissions and more particularly to a bicycle chain transmission the arm of force of the pedal crank of which is automatically changed so as to minimize energy consumption in pedaling.

In a regular bicycle chain transmission, a crank is generally fastened in a chain wheel at the center. During pedaling, the arm of force of a crank does not make any change. As it is known that longer arm of force of a crank can minimize energy consumption in forward pedaling. Therefore, there is a kind of chain structure designed in oval shape so that the arm of force of a crank can be automatically changed during its rotation. This type of design can effectively minimize energy consumption in pedaling. However, a chain may be easily disengaged from an oval shape of chain wheel during rotation.

SUMMARY OF THE INVENTION

The present invention has been accomplished under the circumstances in view. It is one object of the present invention to provide a bicycle chain transmission which can drive a bicycle to run with less labor and without causing a chain to disengage.

According to the present invention, a bicycle chain transmission comprises a bottom bracket bearing device eccentrically mounted on a bottom bracket bearing axle and coupled with a crank and a chain wheel. The chain wheel is movably fastened in a bearing block at one side of the chain wheel so that its arm of force is changed according to its position during the eccentric rotation of the bottom bracket bearing device to minimize energy consumption in pedaling.

BRIEF DESCRIPTION OF THE DRAWINGS

FIG. 1 is a plan view of a bicycle chain wheel according to the prior art;

FIG. 2 is a perspective fragmentary view of a bicycle chain wheel embodying the present invention;

FIG. 3 is a sectional assembly view of the present invention;

DETAILED DESCRIPTION OF THE PREFERRED EMBODIMENT

Figure 6:
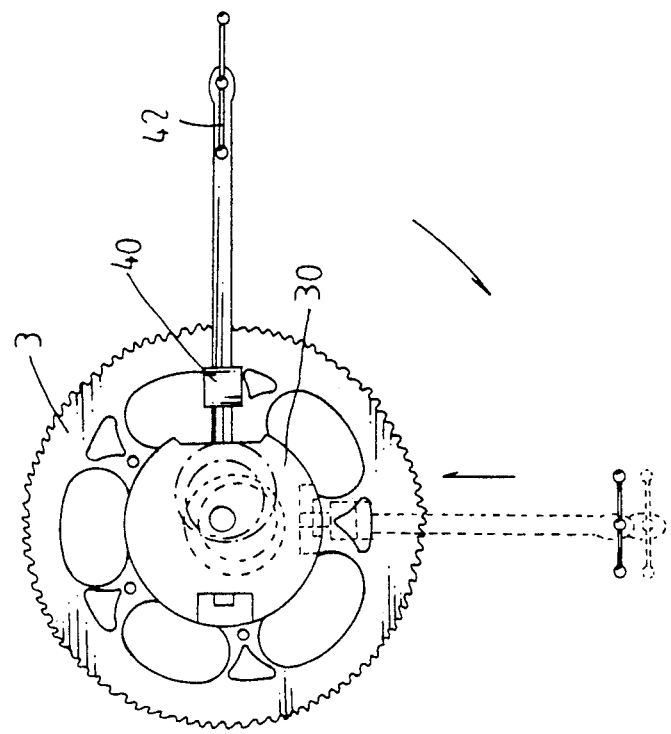
FIGS. 4-6 illustrate the operation of the present invention.

Referring to FIGS. 2 and 3, a bicycle chain transmission in accordance with the present invention is generally comprised of a bottom bracket bearing device 2, a chain wheel 3 and a crank 4. The bottom bracket bearing device 2 is comprised of a connector 20, a hub 21, a bush 22 and a ball bearing 23. The connector 20 comprises a projection 200 extending forward at one end for fastening in the bottom bracket 203 of a bicycle and having an eccentric hole 201 piercing therethrough for the insertion therethrough of the bottom bracket axle 202 of a bicycle to secure the bottom bracket bearing device 2 to the chain wheel 3. A circular groove 204 is made on the connector 20 for mounting the bush 22 so that the ball bearing can be fastened thereto. A plurality of steel balls 230 are fastened in the inner wall surface of the ball bearing 23 and set between the ball bearing 23 and the bush 22, such that the ball bearing 23 is permitted to follow the connector 20 to rotate clockwise or to make idle running in counter-clockwise direction. The ball bearing 23 has an unitary side projection 231 fastened in the chain wheel 3 to connect to a connection member 40 on the crank 4 by a lock pin 400. The chain wheel 3 comprises a bearing block 30 at an outer side. The bearing block 30 has a hole 411 vertically made thereon with two bearings 41 fastened therein at two opposite ends for movably mounting the crank 4. The crank 4 has a pedal 42 fixedly secured thereto at one end through which the crank 4 is pedaled to carry the chain wheel 3 to rotate.

Figure 5:
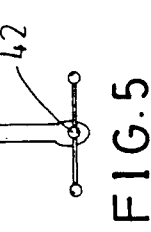
Figure 4:
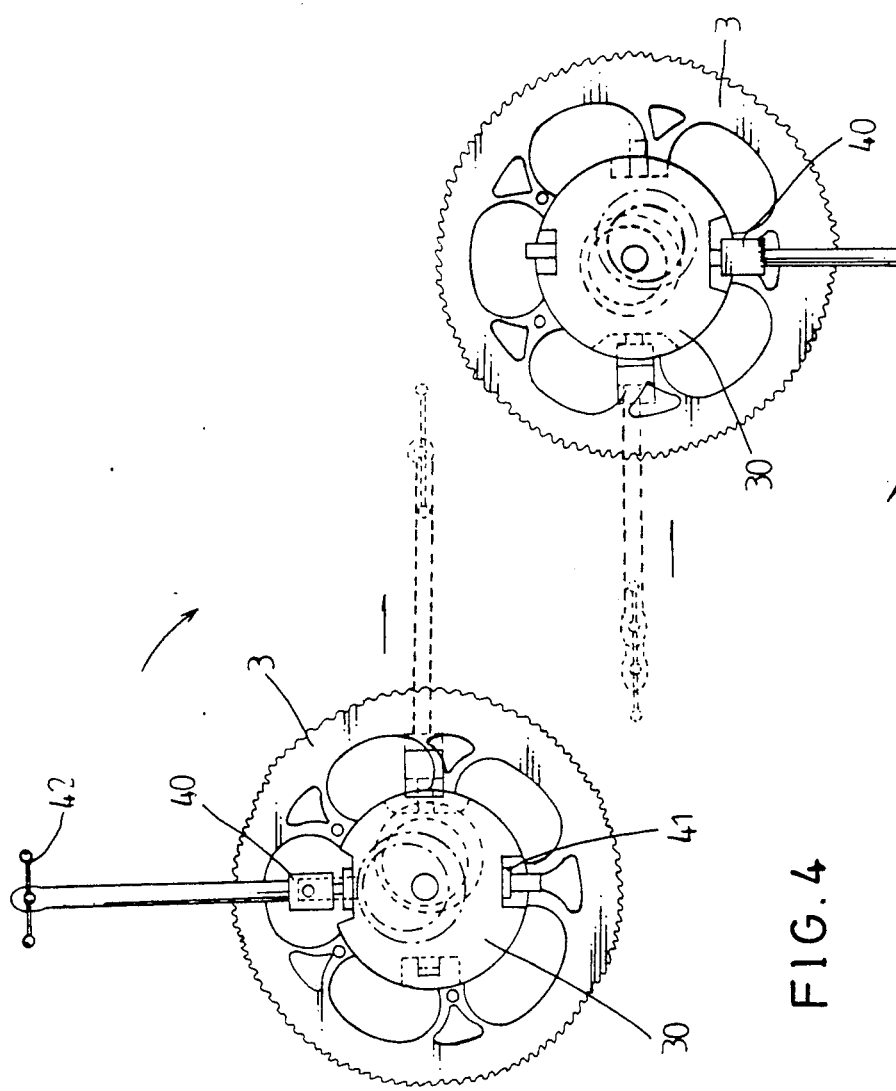

The operation of the present invention is outlined hereinafter with reference to FIGS. 4 through 6. When the pedal 42 is pedaled to rotate the crank 4 from its upper vertical position to a lower vertical position, the ball bearing 23 is carried by the connector 20 to rotate eccentrically around a wider circle. During eccentric rotation of the ball bearing 23 from, the side projection 231 is simultaneously pushed forward to increase the arm of force of crank 4 so as to minimize energy consumption. As soon as the crank is moved to a lower vertical position, the eccentric rotation of the connector 20 relatively shortens the arm of force of the crank 4. After the crank 4 is rotated to a backward position its arm of force is in the shortest condition so that it can be efficiently rotated to the upper vertical position for repeated rotation.

As described above, the present invention is to provide such a bicycle chain transmission, in which the arm of force of the crank is automatically adjusted during its rotation so as to minimize energy consumption in pedaling.

I claim:

1. A bicycle chain transmission, comprising:
   a bottom bracket bearing device comprised of a connector, a hub, a bush and a ball bearing, said connector comprising a projection extending forward at one end for fastening in a bottom bracket of a bicycle, an eccentric hole piercing therethrough for the insertion therethrough of a bottom bracket axle of said bicycle, and a circular groove on its outer wall surface for mounting said bush and said said ball bearing, said ball bearing comprising a side projection, and a plurality of steel balls fastened in its inner wall surface between said bush permitting said ball bearing to to follow said connector to rotate clockwise or to make idle running in counter-clockwise direction;
   a chain wheel mounted on said bottom bracket axle, comprising a bearing block at an outer side, said bearing block having a hole vertically made thereon with two bearings fastened therein at two opposite ends; and
   a crank movably fastened in the two bearings of said bearing block of said chain wheel, having a pedal rotatably secured thereto at one end for pedaling to drive said crank to carry said chain wheel to rotate via said bottom bracket bearing device, and a fastening member at an opposite end for the connection thereto of said unitary side projection of said ball bearing by a lock pin;
   whereby the rotation of said connector drives said ball bearing to rotate eccentrically and to drive said crank to automatically change its arm of force so as to minimize energy consumption in pedaling.

* * * * *